US012284010B1

(12) United States Patent
Guzelgoz et al.

(10) Patent No.: US 12,284,010 B1
(45) Date of Patent: Apr. 22, 2025

(54) METHODS AND APPARATUS FOR BEAMFORMING IN MIMO SYSTEMS

(71) Applicant: Marvell Asia Pte, Ltd., Singapore (SG)

(72) Inventors: Sabih Guzelgoz, San Jose, CA (US); Nagabhushana Kurapati, Milpitas, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 92 days.

(21) Appl. No.: 18/116,212

(22) Filed: Mar. 1, 2023

Related U.S. Application Data

(60) Provisional application No. 63/406,286, filed on Sep. 14, 2022.

(51) Int. Cl.
*H04B 7/0456* (2017.01)
*H04W 72/12* (2023.01)

(52) U.S. Cl.
CPC .......... *H04B 7/0456* (2013.01); *H04W 72/12* (2013.01)

(58) Field of Classification Search
CPC .... H04B 7/0456; H04B 7/0617; H04B 7/063; H04B 7/0632; H04B 7/0634; H04B 7/06958; H04W 72/12; H04W 72/121

USPC ........ 375/260, 267; 370/329, 330, 332, 333, 370/341, 343, 345; 455/450, 452.2, 463, 455/464

See application file for complete search history.

(56) References Cited

U.S. PATENT DOCUMENTS

| 2012/0027111 A1* | 2/2012 | Vook ................... H04B 7/0452 375/267 |
| 2022/0132526 A1* | 4/2022 | Nam ...................... H04L 5/0094 |
| 2022/0263544 A1* | 8/2022 | Namgoong .......... H04B 7/0465 |
| 2023/0156724 A1* | 5/2023 | Liu ....................... H04W 72/23 370/329 |
| 2023/0198815 A1* | 6/2023 | Lu ....................... H04L 25/0258 375/262 |

* cited by examiner

*Primary Examiner* — Young T. Tse
(74) *Attorney, Agent, or Firm* — JW Law Group; James M. Wu

(57) ABSTRACT

Methods and apparatus for beamforming in MIMO systems are disclosed. In an embodiment, a method is provided that includes associating a plurality of signal-to-noise ratio (SNR) ranges with a plurality of precoding schemes, respectively, identifying groups of user equipment (UE) that have SNRs within each SNR range, and configuring downlink transmissions to each group of UE to use a precoding scheme associated with the SNR range of that group.

21 Claims, 5 Drawing Sheets

METHODS AND APPARATUS FOR
BEAMFORMING IN MIMO SYSTEMS

CROSS REFERENCE TO RELATED
APPLICATIONS

This application claims the benefit of priority under 35 U.S.C 119(e) to U.S. Provisional Patent Application No. 63/406,286 filed on Sep. 14, 2022 and entitled "A LOOK UP TABLE BASED USER GROUPING AND PRECODER SELECTION ALGORITHM FOR MASSIVE MIMO," which is incorporated by reference herein in its entirety.

FIELD

The exemplary embodiments of the present invention relate to telecommunications networks. More specifically, the exemplary embodiments of the present invention relate to receiving and processing data streams via a wireless communication network.

BACKGROUND

In wireless communication systems, such as fifth generation (5G) new radio (NR) communication systems, the process of beamforming, also referred to as precoding, is the main approach for increasing downlink throughput. However, there are a variety of precoding techniques that may be utilized. Thus, selecting the correct precoding technique and identifying user equipment (UE) and network conditions for utilizing a particular precoding technique is important for maximizing the benefits of beamforming.

SUMMARY

In various exemplary embodiments, methods and apparatus are provided for beamforming in MIMO systems. In one embodiment, precoding schemes are determined for downlink transmissions to a plurality of user equipment in a MIMO network. A configuration table is utilized comprises multiple entries that associate network configurations with SNR set points. The set points define a plurality of SNR ranges. The configuration table also identifies precoding schemes to be used for each defined SNR range. SNR information associated with a plurality of UE is received and used to group the UEs into one of the defined SNR ranges. Downlink transmissions to UEs in each group will use the precoding scheme assigned to that group. Thus, based on the network configuration and the SNRs associated with a plurality of UEs, the configuration table allows precoding schemes to be flexibly assigned based on network conditions to provide for downlink beamforming.

In an embodiment, the UEs in each group are further sub-grouped. Uncorrelated or minimally uncorrelated UEs in each group are sub-grouped. Thus, each defined group may have one or more sub-groups. Using the sub-groups, downlink transmissions are scheduled so that these transmissions occur for UEs in the same sub-group. Because the sub-groups are part of the same group, the same precoding scheme is used for downlink transmissions to sub-groups in the same group. Using the sub-groups flexible precoding is provided in addition to efficient scheduling of downlink transmissions to avoid potential interference between downlink transmissions.

In an exemplary embodiment, a method is provided that comprises associating a plurality of signal-to-noise ratio (SNR) ranges with a plurality of precoding schemes, respectively, identifying groups of user equipment (UE) that have SNRs within each SNR range, and configuring downlink transmissions to each group of UE to use a precoding scheme associated with the SNR range of that group.

In another exemplary embodiment, an apparatus is provided that comprises a configuration table that associates a plurality of signal-to-noise ratio (SNR) ranges with a plurality of precoding schemes, respectively; and a processor. The processor is configured to perform operations comprising identifying groups of user equipment (UE) that have SNRs within each SNR range, and configuring downlink transmissions to each group of UE to use a precoding scheme associated with the SNR range of that group.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
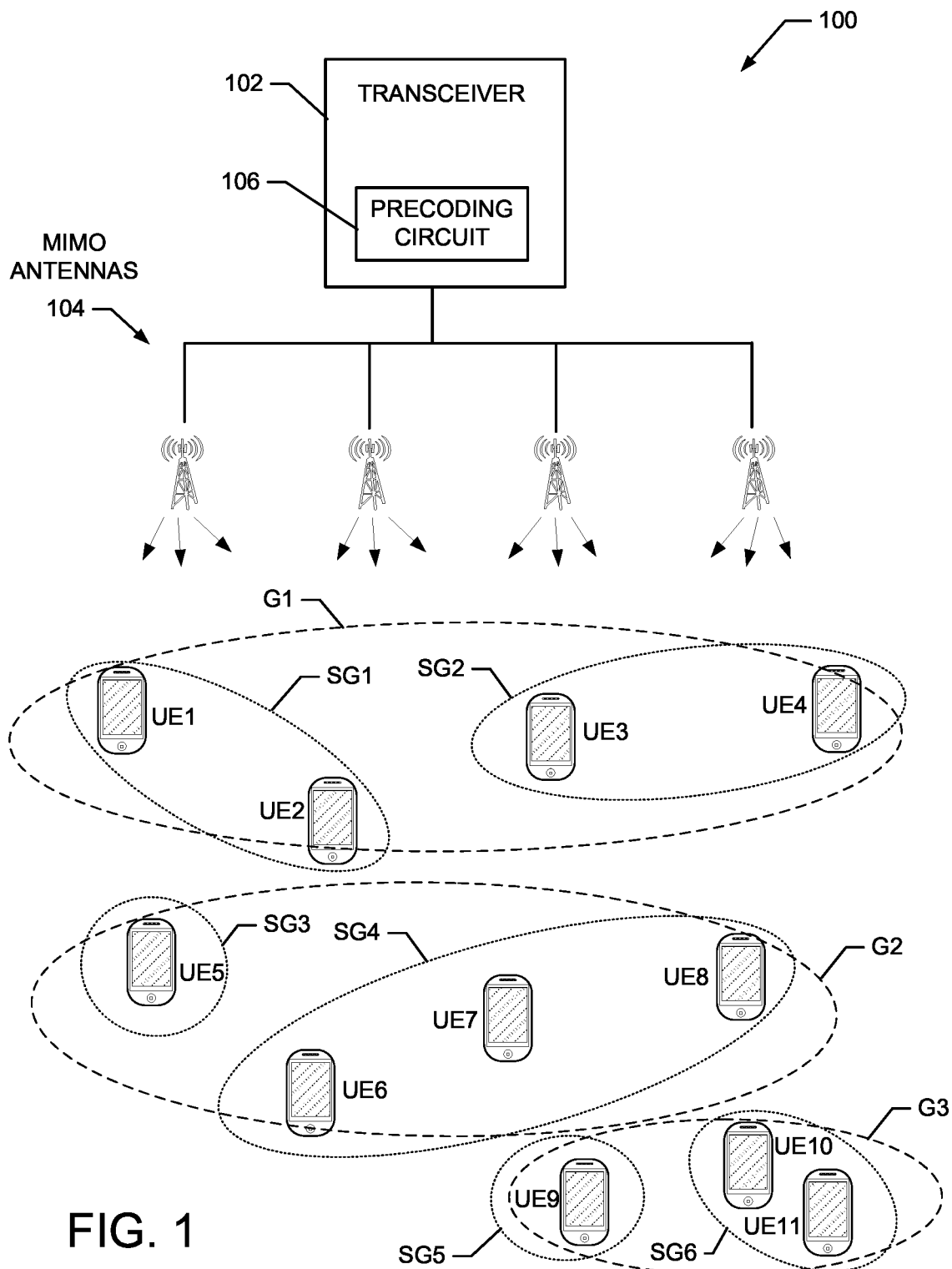
FIG. 1 shows a communication network comprising a transceiver having an embodiment of a precoding circuit.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a MIMO wireless communication network 100 comprising a transceiver 102 having an embodiment of a precoding circuit 106. The MIMO network 100 comprises a plurality of MIMO antennas 104 that provide communication with eleven user equipment (UE1-11) devices.

During operation, the transceiver 102 utilizes the precoding circuit 106 to determine precoding (or beamforming) configurations to provide efficient downlink communications to the UEs to achieve a high level of network performance. In an embodiment, precoding comprises applying a matrix or a weight matrix to a transmit expression. For example, a channel matrix "H" describes the channel conditions to user equipment in a MIMO network. A transmit model can be expressed as (Y=H*S+n) and multiplying H with a precoder matrix will nullify transmissions in selected directions. For example, the precoding matrix can allow transmission to UE1 but nullify the transmission in the direction of UE2 and UE3. Thus, the precoding enhances the SNR for targeted UEs or UEs that are packaged together.

In an embodiment, the precoding circuit 106 performs precoding for downlink communications using one of three precoding schemes. The three precoding schemes are referred to as Maximal Ratio Transmission (MRT), Regularized Zero forcing (RZF) and Block Diagonalization (BD). It should be noted that embodiments of the invention are not limited to these three schemes and that other precoding schemes can be utilized to achieve a desired level of network performance. In various embodiments, the selection of the three precoding schemes is dependent on one or more of the following factors:
  1. Alpha of RZF;
  2. Target number of layers for downlink scheduling;
  3. Target UE allocation map, i.e. map that shows the number of layers per UE;
  4. Number of base station (BS) transmit antennas; and
  5. Power allocation method for the selected precoding scheme.

These factors are evaluated with one or more UE SNR operating points to determine if one precoding scheme is more preferable over the others.

In an exemplary embodiment, the precoding circuit 106 is configured to perform precoding selection based in part on SNR measurements associated with each UE. Thus, as illustrated in FIG. 1, the precoding circuit 106 operates to group UEs by their associated SNR into three groups (G1-3). In an embodiment, the groups are determined by SNR set points, which can be configured based on network performance or other network considerations. Once the groups of UEs are determined, a precoding scheme for downlink communications to each group is selected. For example, for downlink communications to UEs in group G1, MRT precoding is selected, for UEs in group G2, RZF precoding is selected, and for UEs in group G3, BD precoding is selected.

In an exemplary embodiment, the precoding circuit 106 is configured to schedule downlink transmissions to UEs in each group so that the scheduled transmissions are minimally correlated. In an embodiment, the UEs in each group are further grouped into sub-groups (SG) comprising UEs that are minimally correlated. For example, group G1 comprises UE1-UE2 in sub-group SG1, and UE3-UE4 in sub-group SG2. The group G2 comprises UE5 in sub-group SG3, and UE6-UE7-UE8 in sub-group SG4. The group G3 comprises UE9 in sub-group SG5, and UE10-UE11 in sub-group SG6. Thus, the precoding circuit 106 provides both precoding selection and downlink transmission scheduling in a MIMO wireless communication system to enhance network performance.

Figure 2:
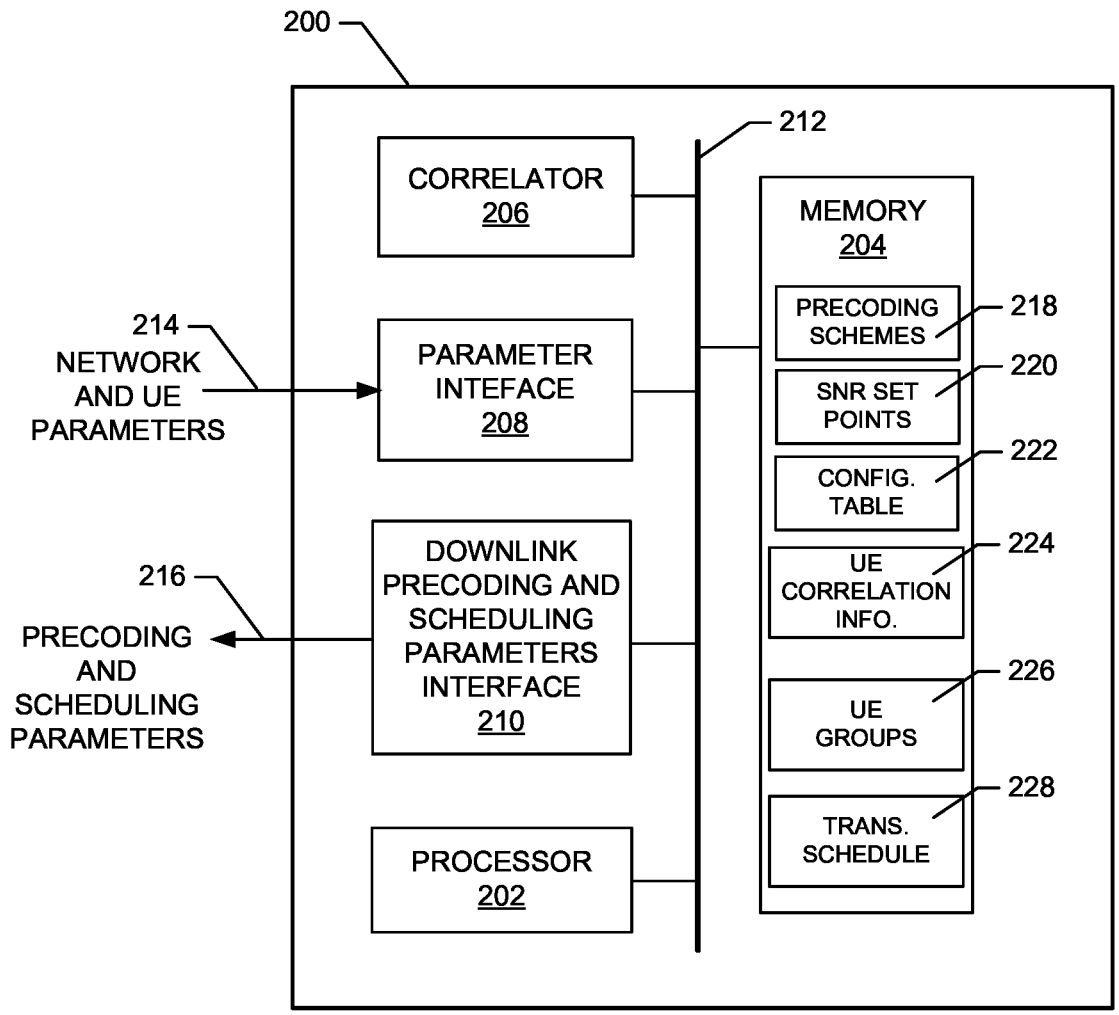
FIG. 2 shows an exemplary embodiment of a precoding circuit.

FIG. 2 shows an exemplary embodiment of a precoding circuit (PC) 200. For example, the PC 200 is suitable for use as the PC 106 shown in FIG. 1. The PC 200 operates to receive information and parameters about UEs and provide both precoding selection and downlink transmission scheduling in a MIMO wireless communication system to enhance network performance.

In an embodiment, the PC 200 comprises processor 202, memory 204, correlator 206, UE parameters interface 208, and downlink precoding and scheduling parameters interface 210 all coupled to communicate over bus 212.

The processor 202 comprises at least one of a CPU, processor, state machine, programmable logic, memory, hardware, and/or discrete components that perform the functions described herein.

The memory 204 comprises any suitable memory, such as RAM, PROM, or other type of memory. In one embodiment, the memory 204 stores precoding schemes 218, SNR threshold value 220, configuration tables 222, UE correlation information 224, UE groupings 226, and transmission schedule 228.

The correlator 206 comprises at least one of a CPU, processor, state machine, programmable logic, memory, hardware, and/or discrete components that perform the functions described herein. The correlator 206 operates to determine the correlation level of UEs. For example, in an embodiment, one or more sub-groups of uncorrelated UEs are identified within each group, where a correlation level of the uncorrelated UEs is below a selected threshold. For example, the processor 202 determines sub-groups of uncorrelated UEs using the correlator 206 to determine a correlation level between UEs. Uncorrelated UEs have a correlation level below a selected threshold. The threshold can be set to any desired level by the processor 202 to identify the amount of correlation between UEs that form a sub-group. The processors 202 schedules downlink transmissions to uncorrelated sub-groups of UEs within each group so that downlink transmissions to these sub-groups can occur with minimal interference.

The UE parameter interface 208 comprises at least one of a CPU, processor, state machine, programmable logic, memory, hardware, and/or discrete components that perform the functions described herein. The UE parameter interface 208 operates to receive network and UE parameters 214 that describe various information about the current network configuration and UEs operating on the network.

The downlink precoding and scheduling parameters interface 210 comprises at least one of registers, gates, latches, hardware components, and/or discrete components that output precoding and scheduling parameters 216. For example, in an exemplary embodiment, the processor 202 controls the interface 210 to output precoding parameters for downlink transmissions to a plurality of UEs. The processor 202 also outputs a transmission schedule to avoid simultaneous downlink transmissions to highly correlated devices.

During operation, the PC 200 comprises precoding schemes 218 and SNR thresholds 220 in memory 204. UE parameter information 214 is received by the interface 208. The parameter information includes UE identifiers and associated SNR levels for each UE. Based on the UE SNR values, the processor 202 determines UE groups 226 that are stored in the memory 204. For example, the configuration tables 222 include SNR set points that define SNR ranges. The processor 202 organizes the UEs in the network into the groups according to their SNR ranges. The processor 202 also identifies a precoding scheme to be used for downlink transmissions to each group of UE. Thus, the most efficient and desired precoding scheme can be selected and utilized based on the SNRs of the UEs. In addition, the processor 202 generates sub-groups of UEs within the groups 226. The sub-groups comprises UEs that are uncorrelated or only minimally correlated. As a result, less interference will be experienced during transmissions to a sub-group. The processor 202 generates a transmission schedule for sub-groups so that downlink transmissions to correlated sub-groups of UEs can be avoided, thereby reducing the chance for interference. The processor 202 outputs the precoding schemes, associated precoding parameters, and the transmission schedule using the interface 210.

Precoder Schemes

In various embodiment, the precoder circuit 200 operates to associated precoder schemes with SNR ranges. Thus, a channel matrix "H" is multiplied by a selected precoder matrix to implement MIMO beamforming. In an embodiment, a singular value decomposition (SVD) is performed on the precoding matrix. Exemplary precoder schemes include the following.

A. An RZF precoder is given by:
1. $H^*(HH^* + aI_K)^{-1}$ (forms an unnormalized weight matrix)
2. Perform power allocation based on available base station power, number of users, number of layers, and other network resource constraints.

B. A BD precoder is given by:
1. For j=1, ..., k
   Compute $\tilde{V}_j^{(0)}$, the right null space of $\tilde{H}_j$
   Compute the SVD as:

$$H_j \tilde{V}_j^{(0)} = U_j \begin{bmatrix} \Sigma_j & 0 \\ 0 & 0 \end{bmatrix} [V_j^{(1)} \ V_j^{(0)}]^*$$

2. Perform power allocation based on available base station power, number of users, number of layers and other network resource constraints.
3. Set $M_S$ as:

$$M_S = [\tilde{V}_j^{(0)} V_1^{(1)} \tilde{V}_2^{(0)} V_2^{(1)} \ldots \tilde{V}_K^{(0)} V_K^{(1)}] \Lambda^{1/2}$$

where the expression within the brackets [ ] represents an unnormalized weight matric and $\Lambda^{1/2}$ represents a power allocation factor. Thus, $M_S$ represents a normalize weight matrix.

C. A MRT precoder is given by:
1. [u s v]=svd(H) (per each user's H)
   Precoder for MRT is: v(: 1: rank(H)) (forms an unnormalized weight matrix)

2. Perform power allocation based on available base station power, number of users, number of layers and other network resource constraints.

Each of the above precoding schemes are used to obtain a particular weight matrix that is applied to the downlink transmit signal to preform beamforming having a selected configuration. A more detailed description of the structure and operation of the precoding circuit is provided below.

Figure 3:
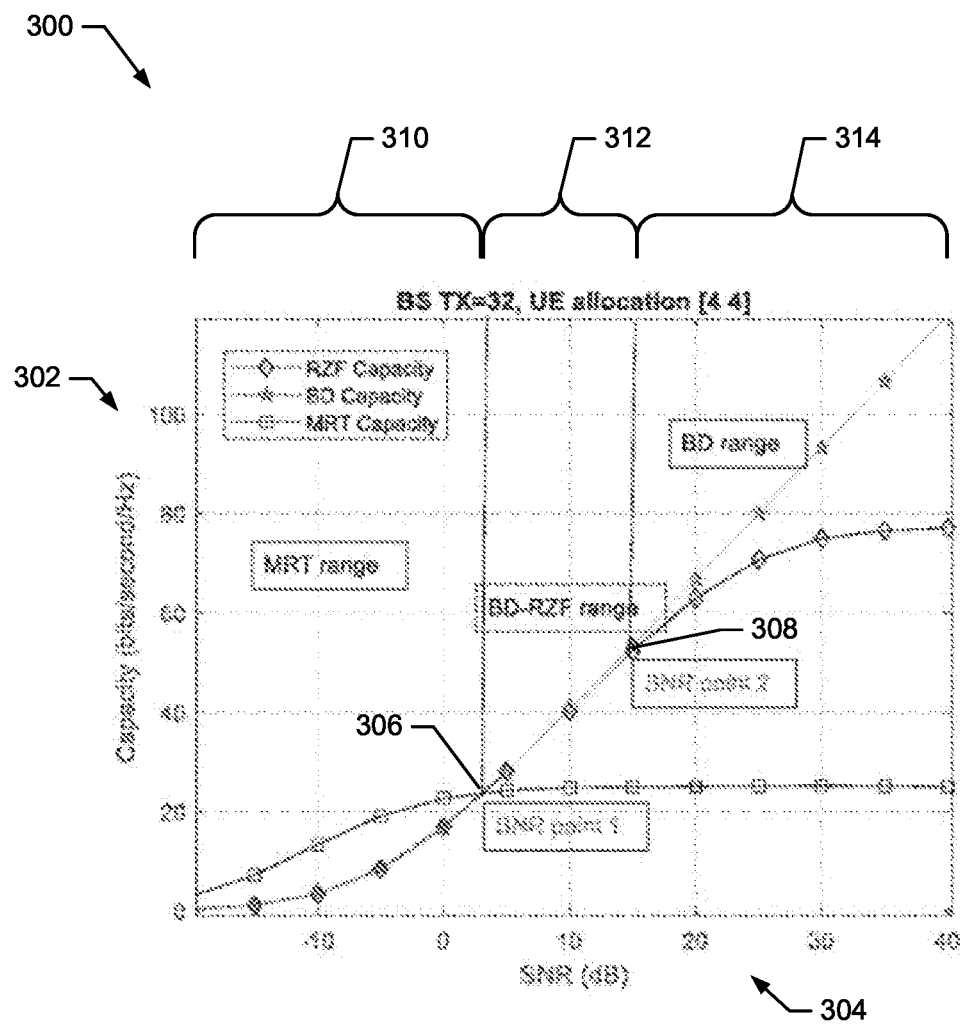
FIG. 3 shows an exemplary graph that illustrates SNR ranges and associated precoding techniques for use in an embodiment of a precoding circuit.

FIG. 3 shows an exemplary graph 300 that illustrates SNR set points and associated precoding ranges for use in an embodiment of a precoding circuit. The graph 300 shows SNR levels 304 along the x-axis and transmission capacity 302 along the y-axis. The graph 300 also shows a first SNR set point 306 at approximately 3 dB and a second SNR set point 308 at approximately 15 dB. The two set points define three SNR ranges. For example, the first set point 306 defines a first range 310, which is assigned MRT precoding. The first set point 306 and the second set point 308 define a second range 312, which is assigned BD-RZP precoding, and the second set point 308 defines a third ranges, which is assigned BD precoding.

In an embodiment, the SNR set points are pre-configured and stored in the memory 204 as SNR set points 220. The SNR set points can also be provided as part of the configuration table 222. The processor 202 uses the stored set points to determine three precoding ranges and can assign any of the precoding schemes 218 to each range.

Figure 4:
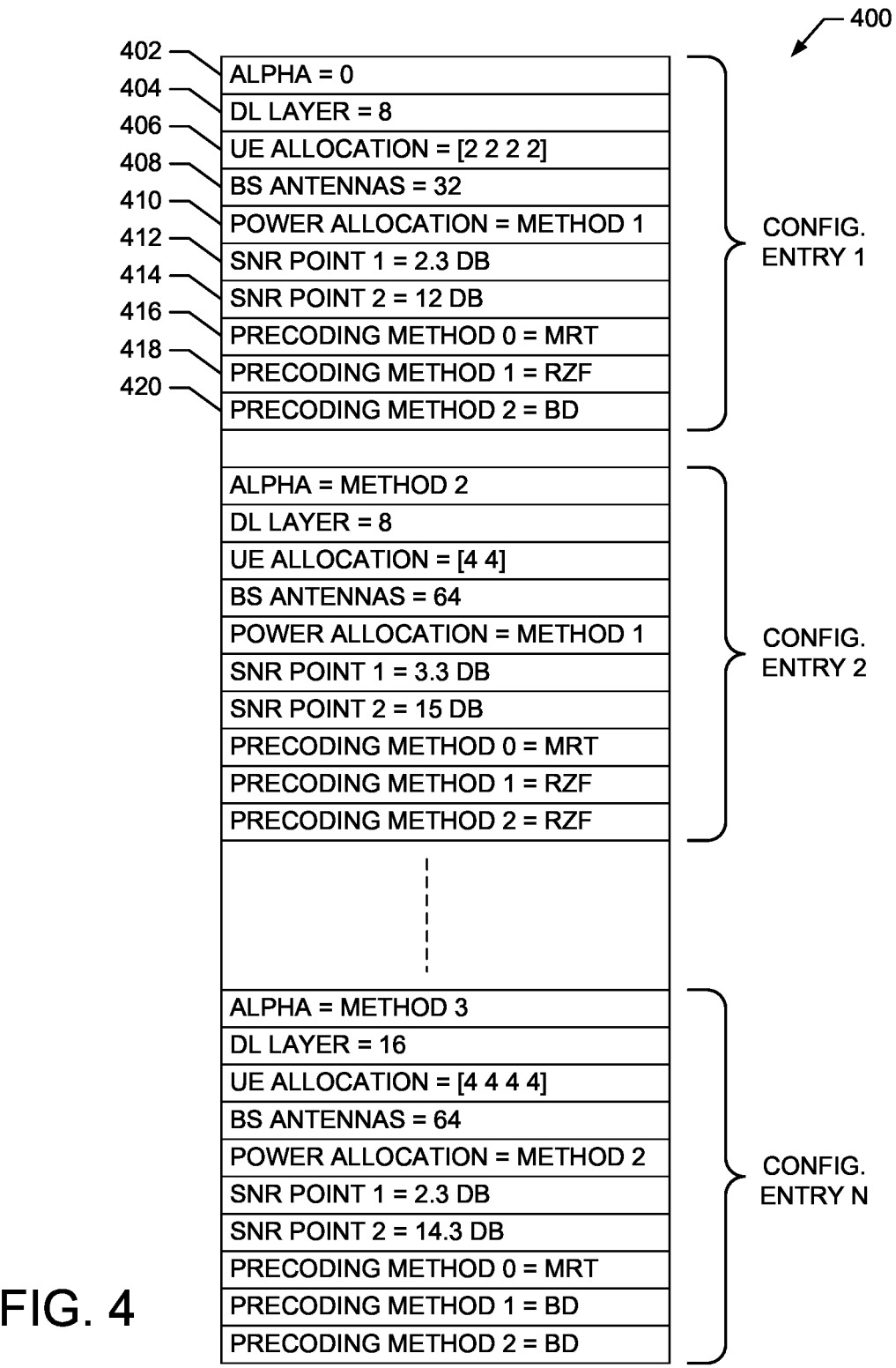
FIG. 4 shows an exemplary configuration table for use in an embodiment of a precoding circuit.

FIG. 4 shows an exemplary configuration table 400 for use in an embodiment of a precoding circuit. For example, the configuration table 400 is suitable for use as the configuration table 222 stored in the memory 204 of the precoding circuit 200.

In an embodiment, the configuration table 400 comprises a plurality of configuration entries (e.g., up to N), and each configuration entry provides network parameters, SNR set points, and associated precoding methods. For example, configuration entry 1 includes network configuration 402, number of downlink layers 404, UE allocation of layers 406 (e.g., 4 UEs allocation 2 layers each), number of base station antennas 408, power allocation method 410, first SNR set point 412, second SNR set point 414, first precoding method 416, second precoding method 418, and third precoding method 420. Thus, based on the downlink configuration of layers and antennas, the processor 202 can determine an entry in the configuration table 400, and from this entry, the processor 202 can obtain SNR set points and associated precoding methods for use during downlink transmissions.

Figure 5:
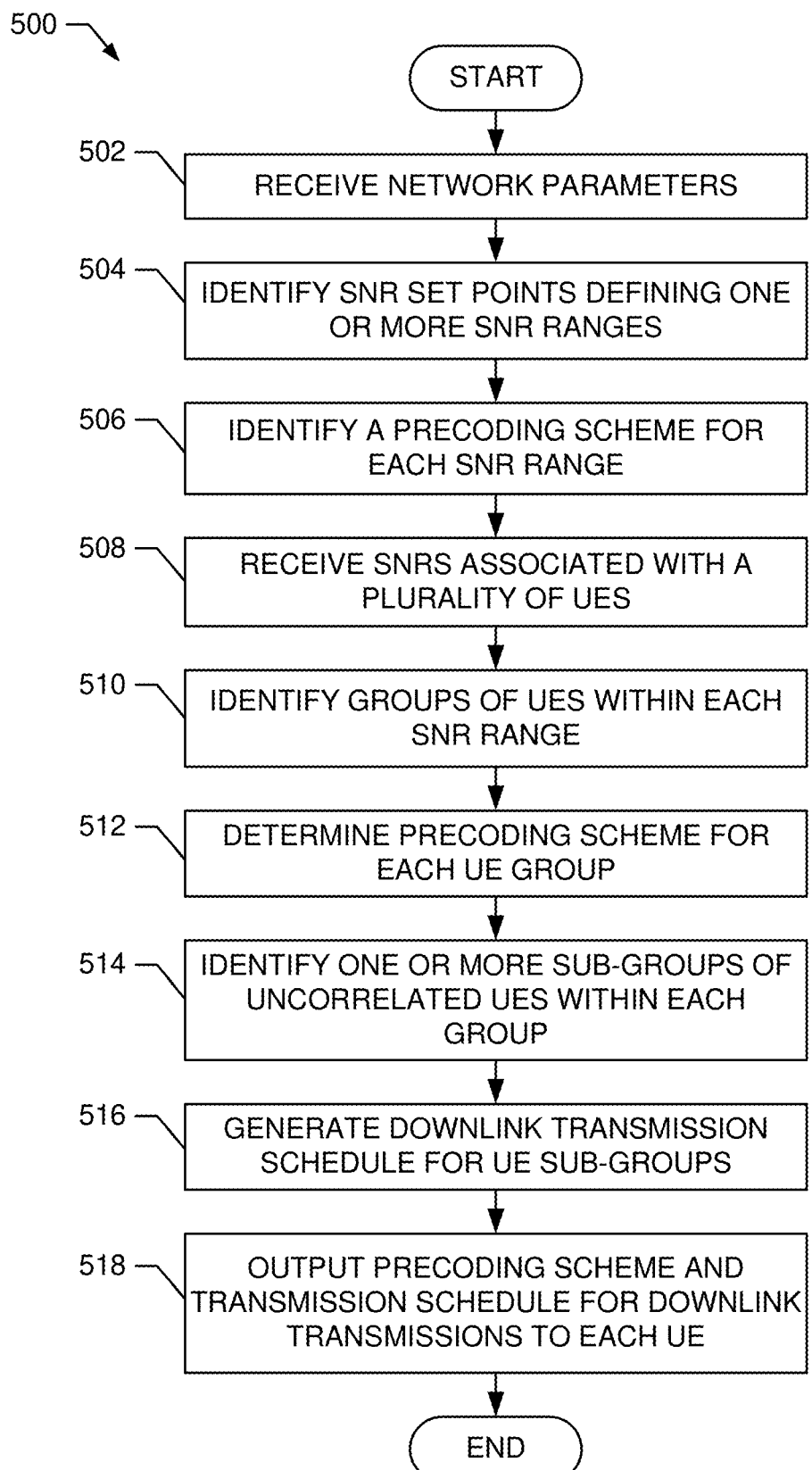
FIG. 5 shows an exemplary method for precoding downlink transmission channels in accordance with the present invention.

FIG. 5 shows an exemplary method 500 for precoding downlink transmissions in accordance with the present invention. For example, the method 500 is suitable for use with the precoding circuit 200 shown in FIG. 2. In an embodiment, the configuration table 222 is preloaded into the memory 204 for use during operation of the precoding circuit 200.

At block 502, network parameters are received. In an embodiment, the parameter interface 208 receives the network parameters and passes these parameters to the processor 202. The parameters comprise a variety of parameters that describe the operation and configuration of the MIMO network. The received parameters comprise an identifier that identifies a configuration entry in the configuration table 222, which describes the network configuration and the available precoding methods.

At block 504, SNR set points are identified. In one embodiment, the configuration entry identified by the network parameters is used to obtained configuration information that identifies SNR set points to be used for the current network conditions. The SNR set points determine multiple SNR ranges.

At block 506, a precoding scheme for each SNR range is determined. For example, the configuration table entry identifies a precoding scheme to be used for each SNR range.

At block 508, SNRs for a plurality of UE are received. For example, the parameter interface 208 receives the SNR information, which describes the SNR for each UE in communication with the MIMO network.

At block 510, groups of UEs within each SNR range are identified based on the received UE SNRs and the SNR ranges determined from the SNR set points. For example, the UEs are grouped so that each UE in a group has an SNR that is within the SNR range for that group. In an embodiment, the UE groups 226 are stored in the memory 204.

At block 512, a precoding scheme for each UE group is identified. For example, the SNR range associated with each group is cross referenced with the identified entry in the configuration table 222 to determine the precoding scheme to be used for UEs in each group.

At block 514, one or more sub-groups of uncorrelated UEs are identified within each group, where a correlation level of the uncorrelated UEs is below a selected threshold. For example, the processor 202 determines sub-groups of uncorrelated UEs using the correlator 206 to determine a correlation level between UEs. Uncorrelated UEs have a correlation level below a selected threshold. The threshold can be set to any desired level to identify the amount of correlation between UEs. The processors 202 schedules downlink transmissions to uncorrelated sub-groups of UEs within each group so that downlink transmissions to these sub-groups can occur with minimal interference.

At block 516, a downlink transmission schedule is generated for UEs of each sub-group. In an embodiment, the processor 202 generates the transmission schedule so that transmissions to UEs in each sub-group will not interfere since the UEs in each sub=group are minimally correlated.

At block 518, the precoding scheme and transmission schedule for each UE is output. For example, the interface 210 outputs the transmission schedule and precoding scheme for downlink transmissions for each UE.

Thus, the method 500 operates to efficiently precode downlink transmissions in a MIMO network. The method 500 also provides transmission schedule to reduce interface of downlink transmission. It should be noted that the operations of the method 500 are exemplary and not limiting, and that the operations can be added to, deleted, rearranged, or otherwise modified within the scope of the embodiments.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method, comprising:
associating a plurality of signal-to-noise ratio (SNR) ranges with a plurality of precoding schemes, respectively;
identifying groups of user equipments (UEs) that have SNRs within each SNR range; and
configuring downlink transmissions to each group of UEs to use one of the precoding schemes associated with the SNR range of that group.

2. The method of claim 1, further comprising:
identifying sub-groups of uncorrelated UEs within each group, wherein a correlation level of the uncorrelated UEs is below a selected threshold; and
scheduling the downlink transmissions for each group, so that downlink transmissions to sub-groups of that group do not occur at the same time.

3. The method of claim 1, wherein the precoding schemes comprise Maximal Ratio Transmission (MRT), Regularized Zero forcing (RZF), and Block Diagonalization (BD) precoding schemes.

4. The method of claim 1, wherein the operation of associating comprises associating any of the precoding schemes with any of the SNR ranges.

5. The method of claim 4, further comprising calculating precoder weights for a selected precoding scheme.

6. The method of claim 1, further comprising identifying SNR set points that define the SNR ranges.

7. The method of claim 6, further comprising identifying two SNR set points that define three SNR ranges.

8. The method of claim 1, further comprising receiving the SNRs of the groups of UEs.

9. The method of claim 1, further comprising performing a singular value decomposition (SVD) for Maximal Ratio Transmission (MRT) precoding for facilitating one or more precoding schemes.

10. The method of claim 1, further comprising optionally performing a singular value decomposition (SVD) for Block Diagonalization (BD) or Regularized Zero forcing (RZF) precoding for facilitating one or more precoding schemes.

11. An apparatus, comprising:
a configuration table that associates a plurality of signal-to-noise ratio (SNR) ranges with a plurality of precoding schemes, respectively; and
a processor that is configured to perform operations comprising:
identifying groups of user equipments (UEs) that have SNRs within each SNR range; and
configuring downlink transmissions to each group of UEs to use one of the precoding schemes associated with the SNR range of that group.

12. The apparatus of claim 11, wherein the processor is further configured to perform operations comprising:
identifying sub-groups of uncorrelated UEs within each group, wherein a correlation level of the uncorrelated UEs is below a selected threshold; and
scheduling the downlink transmissions for each group, so that downlink transmissions to sub-groups of that group do not occur at the same time.

13. The apparatus of claim 11, wherein the precoding schemes comprise Maximal Ratio Transmission (MRT), Regularized Zero forcing (RZF), and Block Diagonalization (BD) precoding schemes.

14. The apparatus of claim 11, wherein the processor is further configured to associate any of the precoding schemes with any of the SNR ranges.

15. The apparatus of claim 11, wherein the processor is further configured to identify SNR set points that define the SNR ranges.

16. The apparatus of claim 15, wherein the processor is further configured to identify two SNR set points that define three SNR ranges.

17. The apparatus of claim 11, wherein the processor is further configured to calculate precoder weights for a selected precoding scheme.

18. The apparatus of claim 11, further comprising an interface configured to receive the SNRs of the groups of UEs.

19. The apparatus of claim 11, wherein the processor is further configured to perform a singular value decomposition (SVD) for Maximal Ratio Transmission (MRT) precoding for facilitating one or more precoding schemes.

20. The apparatus of claim 11, wherein the processor is further configured to optionally perform a singular value decomposition (SVD) for Block Diagonalization (BD) or Regularized Zero forcing (RZF) precoding for facilitating one or more precoding schemes.

21. An apparatus, comprising:
means for associating a plurality of signal-to-noise ratio (SNR) ranges with a plurality of precoding schemes, respectively;
means for identifying groups of user equipments (UEs) that have SNRs within each SNR range;
means for configuring downlink transmissions to each group of UEs to use one of the precoding schemes associated with the SNR range of that group;
means for identifying sub-groups of uncorrelated UEs within each group, wherein a correlation level of the uncorrelated UEs is below a selected threshold; and
means for scheduling the downlink transmissions for each group, so that downlink transmissions to sub-groups of that group do not occur at the same time.

* * * * *